United States Patent Office 2,707,684
Patented May 3, 1955

2,707,684

PROCESS OF PREPARING DEHYDRATED POTATO FOOD PRODUCTS

Rolland M. McCready, Robert L. Olson, and Winfred O. Harrington, Berkeley, Calif., assignors to the United States of America as represented by the Secretary of Agriculture No Drawing. Application January 27, 1950,
Serial No. 140,951

5 Claims. (Cl. 99—207)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the preservation of potatoes and has as its prime object the provision of processes for preparing dehydrated potatoes of superior rehydration properties. Further objects of this invention will be apparent from the description herein.

It is well known in the art that potatoes can be preserved by dehydration. One method of preparing dehydrated potatoes involves peeling the potatoes, dicing them, then heat-treating them with hot water or steam. This heat treatment may be sufficient only to blanch the potatoes, i. e., to inactivate their enzyme content or it may be a more prolonged heat treatment to actually cook the potatoes. If the potatoes are only blanched they must be cooked after rehydration whereas if actually precooked, they will be practically ready to eat upon rehydration. After the heat treatment is complete, the blanched or cooked potatoes are then dehydrated. The products so produced have very poor rehydration properties. The point is that during the dehydration process, the potatoes shrink and turn into a hard, vitreous mass which resists penetration by water. As a result, ordinary dehydrated potatoes, even if precooked before dehydration, must be kept in contact with boiling water for at least a half-hour before they absorb sufficient water to be edible.

It has now been found that if potatoes are subjected to a particular sequence of steps, as herein described, a dehydrated product of superior properties, particularly with regard to rehydration, is produced. In essence, our novel process involves subjecting diced potatoes, after cooking, to freezing at a slow rate. After the cooked dice are frozen they are directly, or after thawing, subjected to conventional dehydration. The products so produced will rehydrate at a rate at least 30 times that required for rehydrating ordinary dehydrated potatoes. Further, the products are not impaired in flavor or color and retain their natural flavor and color for extended periods of time.

The products of this invention are eminently suited for preparing mashed potatoes. Such a dish can readily be prepared by adding 3 to 5 parts of hot water to one part of the product, stirring or whipping for a few minutes and then adding the usual flavoring agents such as salt, pepper, butter, etc. If desired, the water may be wholly or partly replaced by milk. The mashed potatoes so produced are light and fluffy in character. The products are also adapted for preparing hash, stews, chowders, soups, and so forth.

In physical structure the products of this invention are entirely different from those produced by conventional dehydration. Thus the conventionally dehydrated products are yellow, translucent, and have a vitreous texture. Further, during the dehydration the potato pieces shrink so that the final product is much smaller than the original piece and has caved-in sides. On the other hand, the products produced in accordance with this process are white, opaque, and have a soft porous texture so much so that they can readily be crushed between the fingers. Further, during the dehydration, the potatoes do not shrink but their dimensions remain substantially intact.

A further advantage of our process is that the dehydration is performed more efficiently than in commercial practice. This results from the fact that in our process, the potatoes have a permanent porous structure, which is retained even after thawing and during the dehydration whereby the moisture can diffuse through the potato tissue at a high rate. In conventional practice, the potatoes shrink as the dehydration proceeds and become more and more dense whereby the rate of diffusion decreases as the dehydration proceeds.

An important factor in our process is that we do not subject the potatoes to any mashing operation but merely cut the potatoes with a minimum of cell damage into discrete pieces such as dice or slices. Many processes have been advocated for preparing dehydrated potato products in which the potatoes are mashed after cooking and then dehydrated. These processes are not satisfactory mainly because once the potatoes have been mashed they are very difficult to dry. A mass of mashed potatoes cannot be dried by conventional means as the exterior of the mass would dry to a horny material while the interior would still be moist. Consequently, the drying of such products necessitates the extrusion of the mashed potatoes through a sieve to produce elongated pieces such as "rice" or filaments and subjecting these pieces to dehydration. This extrusion of the mashed material is costly and difficult to perform on a commercial scale as it requires special apparatus and high labor costs. The point is that the mashed potatoes contain considerable fibrous material which rapidly clogs the orifices of the sieve requiring frequent shut downs of the process for removing the fibrous material. Another incident of the sieving operation is that the operation tends to damage the cell structure of the potatoes. When this occurs the gelatinized starch within the cells is released and the final product upon reconstitution forms an unpalatable glutinous or pasty mass. Further, the sieved material must be dried in special apparatus such as a duct or kiln drier wherein the sieved pieces are kept in constant agitation by the air stream in the duct or rotation of the kiln so that the pieces will not stick together. Another difficulty in drying mashed potatoes is that in the mashing operation the potato tissue is broken up into individual cells or small groups of cells. When this material is subjected to dehydration, loss of moisture is slow because the moisture must diffuse through the spaces surrounding the cells or groups of cells. On the other hand, when operating in accordance with this invention, the pieces of potato contain their cells virtually intact and in their natural positions. When this material is subjected to dehydration, the loss of moisture is rapid because the moisture diffuses readily from one cell to the next cells which are in contact therewith. This type of diffusion is rapid because the cells are all in contact and not separated from one another as in the case of mashed potato tissue. Many investigators have attempted to cure the above-outlined defects of the mashed potato dehydration process and many procedures have been advocated for eliminating them. Thus it has been advocated that the potatoes be partially de-watered prior to sieving, that the potatoes be mixed with air, dry milk solids, or dried mashed potatoes from a previous batch prior to sieving. All of these procedures merely add further complications to what basically is an unsatisfactory and expensive procedure. The main point which the investigators have missed is that the potatoes should not be mashed. Thus we have found that when the potatoes are merely cut into dice or slices then frozen slowly and dehydrated, all the disadvantages of the prior art are avoided. By eliminating the mashing step we do away with the sieving operation with its attendant complications such as difficulty of sieving, damage to cell structure, and difficulty of dehydration. By slowly freezing the dice or slices the swelled starch granules within the cells form a starch sponge thus establishing a permanent porous structure so that the resulting potato pieces can be readily dehydrated while retaining their size and porous structure. Thus we also avoid the disadvantages of the known process of dehydrating cubes or slices by conventional dehydration. The fact that our products are not mashed does not introduce any complications in rehydrating to form mashed potatoes as our product readily breaks apart on stirring with water to produce a fluffy mashed potato dish.

The process of this invention is carried out in practice as follows:

Raw potatoes are subjected to the usual steps of washing and peeling. The peeled potatoes are then comminuted to form discrete pieces of the potato tissue which may be of any desired form such as cubes, elongated cubes, slices, rods, and so forth. It is essential that this comminution operation be performed with the minimum of damage to the cells and cell walls of the potato tissue. To this end the potatoes should be formed into the desired pieces by a cutting action whereby damage to the cellular structure is reduced to a minimum. In general we prefer to dice the potatoes into pieces about ⅜" x ⅜" x ⅜". However, the potatoes may also be cut into ³⁄₁₆" thick slices or may be otherwise comminuted as by other cutting operations into any desired shapes wherein the smallest dimension is preferably not less than about ⅛".

The cut potatoes are then cooked. The cooking may be accomplished by immersing the potatoes in boiling water or they may be subjected to steam under atmospheric or superatmospheric pressure. The temperature and the duration of the cooking should be controlled so that the potatoes are cooked yet retain their shape. Thus they should be cooked until tender but not so long that they form a mush.

After cooking, the potatoes are frozen. Usually, the cooked potatoes are sprayed with cold water or otherwise precooled to avoid over-taxing the capacity of the refrigerator. The rate at which the potatoes are frozen has great influence on the character of the final product. Thus if the potatoes are frozen slowly, the final product will rehydrate at a high rate whereas if rapid freezing is used, the final products will have a slow rehydration rate. Thus we have found that the cooked potatoes should be subjected to a temperature from about 20° F. to about 28° F. and allowed to remain at this temperature until frozen. At this temperature range, the freezing rate is slow whereby the solubilized starch within the cells sets up a rigid gel or starch sponge which preserves the shape and porosity of the potato piece even after thawing and dehydration. Under such conditions the dehydration is accomplished efficiently and the final product has a high rate of rehydration. On the other hand when the freezing takes place rapidly a permanent shape and porosity is not established and the resulting products on dehydration shrink and become vitreous and rehydrate very slowly.

After being frozen, the potatoes are ready for further treatment. If desired, the frozen potatoes can be permitted to thaw before being subjected to dehydration. However thawing as a separate step is not essential and generally we prefer to subject the frozen potatoes to dehydrating conditions whereby the thawing occurs as part of the dehydration procedure. This dehydration can be accomplished by any of the methods as well known in the art of dehydrating fruits, vegetables, and other perishable foodstuffs. Thus the potatoes after removal from frozen storage, may be placed on trays and passed through a cabinet where they are subjected to a blast of air which may be at room temperature (70° F.) but which is preferably heated to a temperature from about 140° F. to about 160° F. As in conventional dehydration practice, the dehydration is continued until the potatoes have a moisture content less than about 10%, preferably 5% or less.

The following examples exhibit the invention in greater detail. It is understood that these examples are submitted only by way of illustration and not limitation. Two of the following experiments (B and C of Example I) are not illustrative of this invention but are included to show the inferior results obtained when operating outside of the scope of this invention.

*Example I*

A batch of potatoes was washed, peeled, and diced (⅜" x ⅜" x ⅜"). The diced potatoes were divided into three batches, each batch being separately treated as set forth below:

A. (In accordance with this invention.) The diced potatoes were cooked with steam at atmospheric pressure for 15 minutes. The cooked dice were then placed on a tray and put in a refrigerator maintained at 20° F. After storage for 16 hours at this temperature, the frozen dice were placed in a cabinet dehydrator where they were subjected to a blast of air at 150° F. until their moisture content was about 3%. The dehydrated products were observed to have a smooth surface and had approximately the same dimensions as the original dice. In color the products were opaque white and in texture the products were porous and could be easily crushed between the fingers. A rehydration test showed that the products would absorb twice their weight of water at 70° F. in 1 minute.

B. (Not in accordance with this invention—influence of rapid freezing.) The second batch of diced potatoes was cooked as in part A then frozen in a refrigerator maintained at —10° F. The frozen dice were then dehydrated in a cabinet dehydrator with air at a temperature of 150° F. The products so obtained were similar to those obtained by conventional dehydration practice, i. e., they were wrinkled and shrunken from their original dimensions, they were yellow and translucent and of a vitreous texture. The pieces were so hard that they could only be fractured by striking with a sharp instrument. The rehydration test showed that this product absorbed twice its weight of water at 70° F. in 64 minutes.

C. (Conventional dehydrated potatoes.) The third batch of dice was cooked as in part A then dehydrated in a cabinet dryer with a blast of air at 150° F. The products were wrinkled and shrunken from their original dimensions, they were yellow and translucent and of a vitreous texture. The pieces were so hard that they could be fractured only by striking with a hard instrument. The rehydration test showed that this product absorbed twice its weight of water at 70° F. in 30 minutes.

*Example II*

A batch of potatoes was washed, peeled, and diced (⅜" x ⅜" x ⅜"). The diced potatoes were cooked by boiling in water for 15 minutes then drained and sprayed with cold water to cool them. The cooled, cooked potato dice were placed on a tray and put in a refrigerator maintained at 24°–25° F. After storage for 16 hours at this temperature, the frozen dice were placed in a cabinet dehydrator where they were subjected to a blast of air at 150° F. until their moisture content was about 3%. The dehydrated products had approximately the same dimensions and shape as the original dice. In color the products were opaque white and in texture the products were porous and could easily be crushed between the fingers. A portion of the product was added to 5 times its weight of boiling water and stirred. After stirring for 1 minute all the water was absorbed producing a homogeneous mass of mashed potatoes of a fluffy texture.

Having thus described the invention, what is claimed is:

1. A process of preparing a white, opaque, dehydrated potato product comprising discrete pieces having a soft porous texture, which can readily be crushed between the fingers, which readily breaks apart upon stirring with water to produce fluffy mashed potato and which absorbs at least twice its weight of water at 70° F. in one minute, comprising: providing discrete pieces of cooked potato, the cooking being until tender but not so long as to form a mush, the pieces retaining their shape, the cells being virtually intact and in their natural positions, slowly freezing these discrete pieces of potato by subjecting them to a temperature of about 20° F. to about 28° F. and allowing them to remain at this temperature until frozen, whereby the solubilized starch within the cells sets up a rigid starch sponge which preserves the shape and porosity of the potato piece even after thawing and dehydration, and thereafter dehydrating the discrete pieces of frozen potatoes to a moisture content of less than about 10% by subjecting them to a blast of air.

2. The process of claim 1 in which raw potato is cut into pieces, the smallest dimension of which is not less than about 1/8" and with a minimum of damage to cellular structure, the pieces being then cooked, and in which the dehydration is at about 140° F. to 160° F. and to a moisture content of not more than about 5%.

3. A process of preparing a white, opaque, dehydrated potato product comprising discrete pieces having a soft porous texture, which can readily be crushed between the fingers, which readily breaks apart upon stirring with water to produce fluffy mashed potato and which absorbs at least twice its weight of water at 70° F. in one minute, comprising: providing discrete pieces of cooked potato, the smallest dimension of which is not less than 1/8 inch, the cooking being until tender but not so long as to form a mush, the pieces retaining their shape, the cells being virtually intact and in their natural positions, slowly freezing these discrete pieces of potato by subjecting them to a freezing temperature not lower than about 20° F. and allowing them to remain at this temperature until frozen, whereby the solubilized starch within the cells sets up a rigid starch sponge formation which preserves the shape and porosity of the potato piece even after thawing and dehydration, and thereafter dehydrating the discrete pieces of frozen potatoes to a moisture content of less than about 10%, the pieces of dehydrated potato retaining their dimensions substantially intact.

4. A process of preparing a white, opaque, dehydrated potato product comprising discrete pieces having a soft porous texture, which can readily be crushed between the fingers, which readily breaks apart upon stirring with water to produce fluffy mashed potato and which absorbs at least twice its weight of water at 70° F. in one minute, comprising: providing discrete pieecs of cooked potato, the cooking being until tender but not so long as to form   mush, the pieces retaining their shape, the cells being virtually intact and in their natural positions, thereafter, without intermediate treatment, slowly freezing these discrete pieces of potato by subjecting them to a temperature of about 20° F. to about 28° F., and allowing them to remain at this temperature until frozen, whereby the solubilized starch within the cells sets up a rigid starch sponge which preserves the shape and porosity of the potato piece even after thawing and dehydration, and thereafter dehydrating the discrete pieces of frozen potatoes to a moisture content of less than about 10% by subjecting them to a blast of air.

5. A process for preparing dehydrated potatoes of superior rehydration properties which comprises cutting raw potatoes into discrete pieces, cooking the cut potatoes until tender but not so long as to form a mush, to produce discrete pieces of cooked potato in which the cells are virtually intact and in their original positions, subjecting the discrete cooked pieces without intermediate dehydration to a temperature between about 20° F. and 28° F. whereby they are frozen at a slow rate, so as to induce starch sponge formation of the swelled starch granules within the cells, and then dehydrating the discrete pieces by subjecting them to a blast of gas.

References Cited in the file of this patent

UNITED STATES PATENTS

| | | |
|---|---|---|
| 2,278,472 | Musher | Apr. 7, 1942 |
| 2,292,447 | Irwin | Aug. 11, 1942 |
| 2,523,552 | Birdseye | Sept. 26, 1950 |